(12) United States Patent
Yamagishi

(10) Patent No.: US 12,365,136 B2
(45) Date of Patent: Jul. 22, 2025

(54) STEREOLITHOGRAPHY DEVICE AND METHOD FOR PRODUCING STRUCTURE

(71) Applicant: Fujikura Ltd., Tokyo (JP)

(72) Inventor: Hiroyuki Yamagishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 119 days.

(21) Appl. No.: 18/267,496

(22) PCT Filed: Aug. 18, 2021

(86) PCT No.: PCT/JP2021/030142
§ 371 (c)(1),
(2) Date: Jun. 15, 2023

(87) PCT Pub. No.: WO2022/137640
PCT Pub. Date: Jun. 30, 2022

(65) Prior Publication Data
US 2024/0051226 A1 Feb. 15, 2024

(30) Foreign Application Priority Data
Dec. 25, 2020 (JP) ................................ 2020-217511

(51) Int. Cl.
*B29C 64/277* (2017.01)
*B29C 64/124* (2017.01)
(Continued)

(52) U.S. Cl.
CPC .......... *B29C 64/277* (2017.08); *B29C 64/124* (2017.08); *B29C 64/129* (2017.08);
(Continued)

(58) Field of Classification Search
CPC .... B29C 64/124; B29C 64/129; B29C 64/135
See application file for complete search history.

(56) References Cited

U.S. PATENT DOCUMENTS

| 8,697,346 B2 | 4/2014 | McLeod et al. |
| 9,453,142 B2 | 9/2016 | Rolland et al. |
| (Continued) | | |

FOREIGN PATENT DOCUMENTS

| CN | 110524875 A | * 12/2019 | .......... B29C 64/129 |
| CN | 112693113 B | * 4/2022 | .......... B29C 64/129 |
| (Continued) | | | |

OTHER PUBLICATIONS

English translation of an International Preliminary Report on Patentability (IPRP) and Written Opinion issued in corresponding International Application No. PCT/JP2021/030142, dated Jun. 13, 2023 (8 pages).

(Continued)

*Primary Examiner* — Atul P. Khare
(74) *Attorney, Agent, or Firm* — Osha Bergman Watanabe & Burton LLP

(57) ABSTRACT

A stereolithography device includes: a container that stores a photocurable resin before curing, the container having a bottom plate that is optically transparent; a holder configured to be immersed into the photocurable resin; a reaction light irradiation section configured to irradiate a reaction light that accelerates curing of the photocurable resin, wherein the reaction light passes through a boundary surface between the bottom plate and the photocurable resin; and an inhibition light irradiation section configured to irradiate an inhibition light that inhibits curing of the photocurable resin, wherein the inhibition light is totally reflected at the boundary surface.

4 Claims, 5 Drawing Sheets

(51) Int. Cl.

| | | |
|---|---|---|
| *B29C 64/129* | (2017.01) | |
| *B29C 64/255* | (2017.01) | |
| *B29C 64/268* | (2017.01) | |
| *B33Y 10/00* | (2015.01) | |
| *B33Y 30/00* | (2015.01) | |
| *G02B 27/42* | (2006.01) | |
| *B33Y 70/00* | (2020.01) | |

(52) U.S. Cl.
CPC .......... *B29C 64/255* (2017.08); *B29C 64/268* (2017.08); *B33Y 10/00* (2014.12); *B33Y 30/00* (2014.12); *G02B 27/4233* (2013.01)

(56) References Cited

U.S. PATENT DOCUMENTS

| | | | | |
|---|---|---|---|---|
| 10,166,725 | B2 * | 1/2019 | Willis | B29C 64/106 |
| 10,245,785 | B2 * | 4/2019 | Adzima | B29C 64/135 |
| 10,471,699 | B2 | 11/2019 | Ermoshkin et al. | |
| 10,882,251 | B2 * | 1/2021 | Lin | B33Y 70/10 |
| 10,935,891 | B2 * | 3/2021 | Lin | G03F 7/0037 |
| 11,305,482 | B2 * | 4/2022 | Xu | B29C 64/268 |
| 11,351,735 | B2 * | 6/2022 | Greene | B29C 64/393 |
| 12,145,320 | B2 * | 11/2024 | Gupta | G05B 19/4099 |
| 2011/0039213 | A1 | 2/2011 | Fourkas et al. | |
| 2018/0015661 | A1 | 1/2018 | Xu et al. | |
| 2018/0243976 | A1 | 8/2018 | Feller | |
| 2022/0258410 | A1 * | 8/2022 | Ferre Romeu | B29C 64/282 |
| 2022/0363010 | A1 * | 11/2022 | Kostenko | B29C 64/286 |

FOREIGN PATENT DOCUMENTS

| | | | | | |
|---|---|---|---|---|---|
| CN | 115157666 | A * | 10/2022 | ............ | B28B 1/001 |
| JP | 2020066236 | A | 4/2020 | | |
| WO | WO-2017102700 | A1 * | 6/2017 | ............ | B29C 64/124 |
| WO | WO-2017104368 | A1 * | 6/2017 | ............ | B29C 67/00 |
| WO | 2020064779 | A1 | 4/2020 | | |
| WO | WO-2020139858 | A1 * | 7/2020 | ............ | B29C 64/124 |
| WO | 2020180254 | A1 | 9/2020 | | |

OTHER PUBLICATIONS

International Search Report issued in corresponding International Application No. PCT/JP2021/030142, dated Sep. 21, 2021 (2 pages).

* cited by examiner

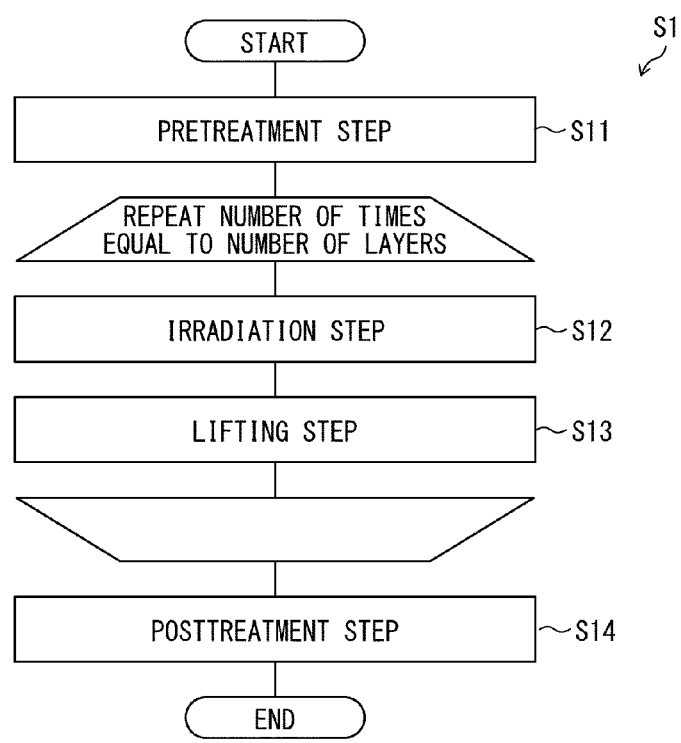

STEREOLITHOGRAPHY DEVICE AND METHOD FOR PRODUCING STRUCTURE

TECHNICAL FIELD

The present invention relates to a stereolithography device which carries out stereolithography. The present invention also relates to a method for producing a structure using stereolithography.

BACKGROUND

A stereolithography method (also called a vat polymerization method) is known as one of methods for shaping a structure which is made of a resin. In the stereolithography method, a container in which a photocurable resin before curing is stored and a holder that is immersed into the photocurable resin before curing are used. The container has a bottom plate which is made of an optically transparent material so that reaction light which accelerates curing of the photocurable resin passes therethrough. Then, by repeating a step of irradiating, with reaction light, a photocurable resin before curing, which is present between the bottom plate of the container and the bottom surface of the holder, and a step of lifting the holder, a structure made of a cured photocurable resin is shaped in a layer-by-layer manner. The shaped structure is lifted together with the holder in a state of adhering to the bottom surface of the holder.

In order to shape a structure having a microstructure using the stereolithography method, it is necessary to make the amount by which the holder is lifted in each cycle as small as the scale of the microstructure. However, in the shaping method, the structure made of the cured photocurable resin adheres to the bottom plate of the container, which can make it difficult to carry out minute lifting of such a holder.

As a technique for preventing the structure made of the cured photocurable resin from adhering to the bottom plate of the container, a method is known in which curing inhibition is caused by introducing oxygen into the vicinity of the bottom plate of the container (Patent Literatures 1 and 2). Firstly, an oxygen permeation membrane is required to carry out the method. The oxygen permeation membrane has a thin film thickness, low rigidity, and low strength. Thus, the oxygen permeation film tends to have unevenness, wrinkles, and the like, and as a result, it is difficult to stably carry out stereolithography. Secondly, the concentration of oxygen to be introduced into the vicinity of the bottom plate of the container is highest at the surface of the oxygen permeation membrane, and has a broad distribution such that the concentration gradually decreases with increasing distance from the oxygen permeation membrane. Thus, curing inhibition occurs even at a location away from the bottom plate of the container. In order to limit a region where curing inhibition occurs to an immediate vicinity of the bottom plate of the container, it is necessary to precisely control an oxygen permeability of an oxygen permeation membrane, an oxygen concentration, a flow rate, and the like. However, it is difficult to carry out such control while a shaping speed changes. Thirdly, since oxygen gas is utilized to cause curing inhibition, it is difficult to locally cause curing inhibition.

As another technique for preventing the structure made of the cured photocurable resin from adhering to the bottom plate of the container, a method is known in which irradiation with inhibition light that inhibits curing of a photocurable resin is carried out together with irradiation with reaction light that accelerates curing of the photocurable resin (Patent Literature 3).

PATENT LITERATURES

Patent Literature 1

Specification of U.S. Pat. No. 9,453,142

Patent Literature 2

Specification of U.S. patent Ser. No. 10/471,699

Patent Literature 3

Specification of U.S. Pat. No. 8,697,346

However, in the technique described in Patent Literature 3, both the irradiation with the reaction light and the irradiation with the inhibition light are carried out so that the reaction light and the inhibition light pass through a boundary surface between the bottom plate of the container and the photocurable resin before curing. Thus, inhibition light enters the entire region where the reaction light enters. That is, the entirety of the photocurable resin between the bottom plate of the container and the bottom surface of the holder is irradiated with both the reaction light and the inhibition light. Thus, if the reaction light is too strong, the structure made of the cured photocurable resin adheres to the bottom plate of the container, and if the inhibition light is too strong, curing of the photocurable resin does not proceed between the bottom plate of the container and the bottom plate of the holder.

SUMMARY

One or more embodiments of the present invention provide a technique of, while allowing curing of a photocurable resin between a bottom plate of a container and a bottom surface of a holder to reliably proceed, reducing the possibility that a structure made of a cured photocurable resin adheres to the bottom plate of the container.

A stereolithography device in accordance with one or more embodiments of the present invention includes: a container for storing a photocurable resin before curing, the container having an optically transparent bottom plate; a holder configured to be immersed into the photocurable resin; a reaction light irradiation section configured to carry out irradiation with reaction light having an action of accelerating curing of the photocurable resin in a manner such that the reaction light passes through a boundary surface between the bottom plate and the photocurable resin; and an inhibition light irradiation section configured to carry out irradiation with inhibition light having an action of inhibiting curing of the photocurable resin in a manner such that the inhibition light is totally reflected at the boundary surface.

A method for producing a structure in accordance with one or more embodiments of the present invention includes: a pretreatment step of storing, in a container having an optically transparent bottom plate, a photocurable resin before curing, and immersing a holder into the photocurable resin; and an irradiation step of carrying out irradiation with reaction light having an action of accelerating curing of the photocurable resin in a manner such that the reaction light passes through a boundary surface between the bottom plate and the photocurable resin, and carrying out irradiation with inhibition light having an action of inhibiting curing of the photocurable resin in a manner such that the inhibition light is totally reflected at the boundary surface.

According to one or more embodiments of the present invention, it is possible to, while allowing curing of a photocurable resin between a bottom plate of a container and a bottom surface of a holder to reliably proceed, reduce the possibility that a structure made of a cured photocurable resin adheres to the bottom plate of the container.

BRIEF DESCRIPTION OF DRAWINGS

FIG. 2 is a flowchart illustrating a flow of a method for producing a structure with use of the stereolithography device illustrated in FIG. 1A.

DETAILED DESCRIPTION (Configuration of Shaping Device)

Figure 1A:
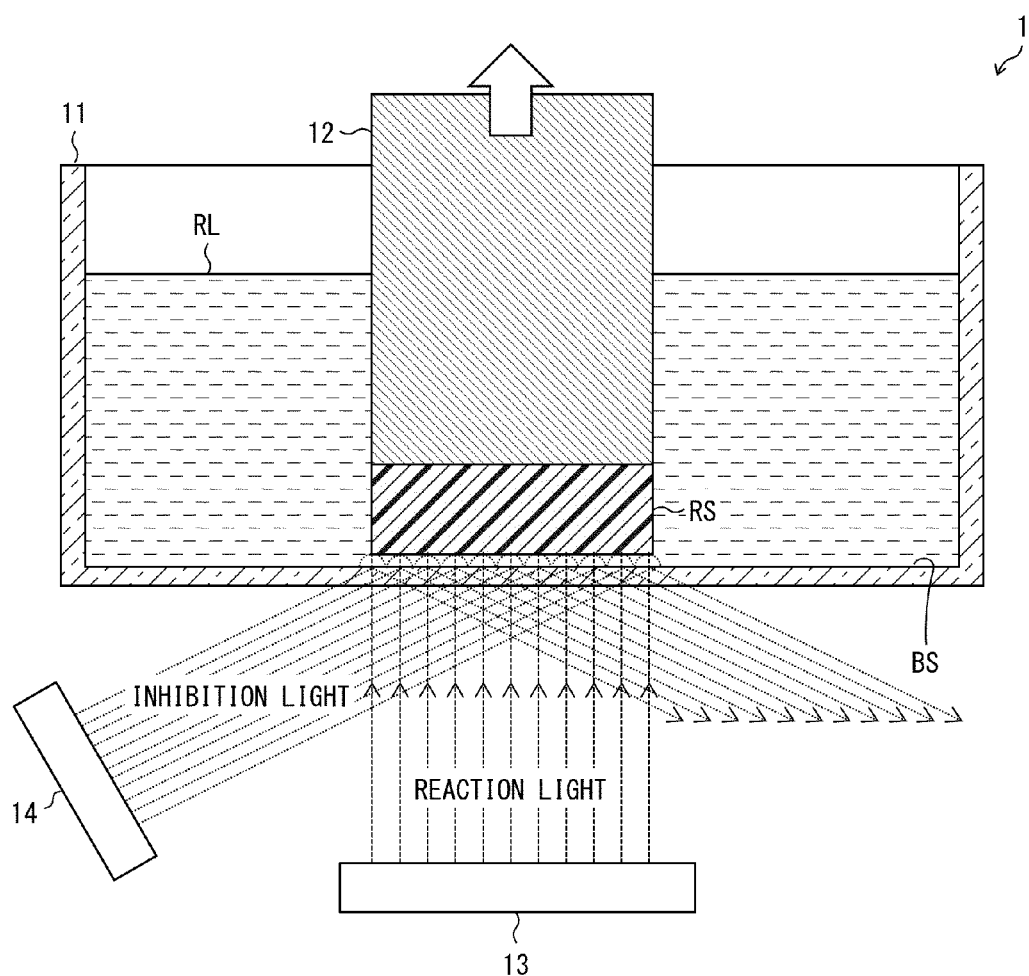
FIGS. 1A and 1B show a cross-sectional view illustrating a configuration of a stereolithography device in accordance with one or more embodiments of the present invention.
Figure 1B:
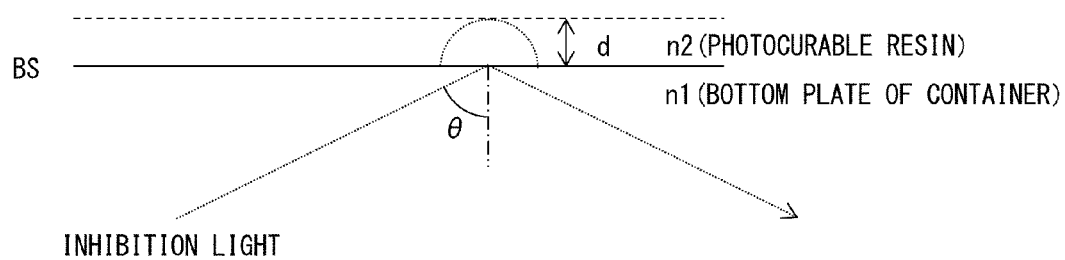

A configuration of a stereolithography device 1 in accordance with one or more embodiments of the present invention will be described with reference to FIGS. 1A and 1B. FIG. 1A is a cross-sectional view of the stereolithography device 1. FIG. 1B is a schematic diagram illustrating a state in which evanescent light occurs when inhibition light is totally reflected in the stereolithography device 1.

The stereolithography device 1 is a device for producing a structure made of a resin, and, as illustrated in FIG. 1A, includes a container 11, a holder 12, a reaction light irradiation section 13, and an inhibition light irradiation section 14. The stereolithography device 1 also includes a lifting mechanism (not illustrated) that lifts the holder 12.

The container 11 is a component for storing a photocurable resin before curing (hereinafter also referred to as "photocurable resin RL"). The container 11 is, for example, in the shape of a square measuring box or in the shape of a tub. A bottom plate 111 of the container 11 is made of at least an optically transparent material that allows reaction light and inhibition light (described later) to pass therethrough. The holder 12 is a component for supporting a photocurable resin after curing (hereinafter also referred to as "photocurable resin RS"). The shape of the holder 12 is, for example, a quadrangular prism shape or a cylindrical shape. The holder 12 is immersed into the photocurable resin RL in a manner such that a bottom surface 121 thereof faces the bottom plate 111 of the container 11.

The reaction light irradiation section 13 is a component for carrying out irradiation with reaction light in a manner such that the reaction light passes through a boundary surface BS between the bottom plate 111 of the container 11 and the photocurable resin RL. Note here that the reaction light refers to light having an action of accelerating curing of the photocurable resin RL. The irradiation with the reaction light carried out by the reaction light irradiation section 13 accelerates curing of the photocurable resin RL that is present between the bottom plate 111 of the container 11 and the bottom surface 121 of the holder 12.

Note that the reaction light irradiation section 13 may be (A1) a light source (e.g., an LD, an LED, a lamp, or the like) that generates reaction light, (A2) a reflector (e.g., a mirror, a prism, or the like) that reflects reaction light generated by a light source which is provided separately, (A3) a lens that collects or collimates reaction light generated by a light source which is provided separately, or (A4) an optical waveguide (e.g., an optical fiber or the like) that guides reaction light generated by a light source which is provided separately. In a case where the configuration (A2), the configuration (A3), or the configuration (A4) is employed, the light source which is provided separately can also be a constituent component of the stereolithography device 1.

Further, the reaction light irradiation section 13 may be configured to (B1) irradiate, with reaction light, an entirety of the photocurable resin RL that is present between the bottom plate 111 of the container 11 and the bottom surface 121 of the holder 12 or to (B2) irradiate, with reaction light, a part of the photocurable resin RL that is present between the bottom plate 111 of the container 11 and the bottom surface 121 of the holder 12. In a case where the configuration (B1) is employed, for each layer of a structure, shaping of individual points constituting the layer is carried out collectively. In a case where the configuration (B2) is employed, for each layer of a structure, an irradiation point of the reaction light is moved in such a manner as to scan the bottom surface 121 of the holder 12, so that shaping of the individual points constituting the layer is sequentially carried out. Note that FIG. 1A illustrate the configuration (B1).

The inhibition light irradiation section 14 is a component for carrying out irradiation with inhibition light in a manner such that the inhibition light is totally reflected at the boundary surface BS between the bottom plate 111 of the container 11 and the photocurable resin RL. Note here that the inhibition light refers to light that acts to inhibit curing of the photocurable resin RL. When the inhibition light irradiation section 14 carries out irradiation with the inhibition light, the inhibition light, as evanescent light, enters the photocurable resin RL from the boundary BS. Assuming that a region where the intensity of the evanescent light becomes 1/e or more of the intensity at the boundary surface BS is a region where the evanescent light enters, the thickness d of the region is given by $d=\lambda/\{4\pi (n_1^2 \times \sin^2\theta - n_2^2)^{1/2}\}$. Note here that $\lambda$ is a wavelength of the inhibition light, and $\theta$ is an incidence angle of the inhibition light with respect to the boundary surface BS. Note also that n1 is a refractive index of the bottom plate 111 of the container 11, and n2 is a refractive index of the photocurable resin RL. In the region where the evanescent light enters, curing of the photocurable resin RL does not occur or insufficiently occurs even when the region is irradiated with the reaction light.

Note that the inhibition light irradiation section 14 may be (C1) a light source (e.g., an LD, an LED, a lamp, or the like) that generates inhibition light, (C2) a reflector (e.g., a mirror, a prism, or the like) that reflects inhibition light generated by a light source which is provided separately, (C3) a lens that collects or collimates inhibition light generated by a light source which is provided separately, or (C4) an optical waveguide (e.g., an optical fiber) that guides inhibition light generated by a light source which is provided separately. In a case where the configuration (C2), the configuration (C3), or the configuration (C4) is employed, the light source which is provided separately can also be a constituent component of the stereolithography device 1.

Further, the inhibition light irradiation section 14 may be configured to (D1) irradiate, with inhibition light, the entirety of the region of the bottom plate 111 of the container 11 which region faces the bottom surface 121 of the holder 12 or to (D2) irradiate, with inhibition light, a part of the region of the bottom plate 111 of the container 11 which region faces the bottom surface 121 of the holder 12. In a case where the configuration (B1) is employed for the reaction light irradiation section 13, the configuration (D1) may be employed for the inhibition light irradiation section 14. In a case where the configuration (B2) is employed for the reaction light irradiation section 13, the configuration (D1) may be employed for the inhibition light irradiation section 14, or the configuration (D2) may be employed for the inhibition light irradiation section 14. However, in the case where the configuration (D2) is employed, the irradiation point of the inhibition light may be moved such that the irradiation point of the inhibition light always encompasses the irradiation point of the reaction light.

Note that, as the reaction light and the inhibition light, for example, light having a wavelength of not less than 100 nm and not more than 500 nm can be used. However, the wavelength of the reaction light and the wavelength of the inhibition light may be different from each other. As an example, a combination of reaction light having a wavelength of 470 nm and inhibition light having a wavelength of 375 nm is conceivable.

(Method for Producing Structure with Use of Stereolithography Device)

A flow of a method S1 for producing a structure with use of the stereolithography device 1 will be described with reference to FIG. 2. FIG. 2 is a flowchart illustrating a flow of the production method S1.

The production method S1 includes a pretreatment step S11, an irradiation step S12, a lifting step S13, and a posttreatment step S14. The irradiation step S12 and the lifting step S13 are repeated a predetermined number of times. For example, in a case where a structure of n layers (n is an arbitrary natural number) is shaped in a layer-by-layer manner, the irradiation step S12 and the lifting step S13 are repeated n times.

The pretreatment step S11 is a step of storing the photocurable resin RL in the container 11 and immersing the holder 12 into the photocurable resin RL. Note here that the holder 12 is immersed into the photocurable resin RL in a manner such that the bottom surface 121 is spaced from the bottom plate 111 of the container 11 and in a manner such that the reaction light reaches the bottom surface 121 in the irradiation step S12 (described later). The storage of the photocurable resin RL and the immersion of the holder 12 may be carried out manually by an operator or may be carried out automatically by the stereolithography device 1 or other device.

The irradiation step S12 is a step of the reaction light irradiation section 13 carrying out irradiation with reaction light and the inhibition light irradiation section 14 carrying out irradiation with inhibition light. Note here that the irradiation with the reaction light is carried out in a manner such that the reaction light passes through the boundary surface BS between the bottom plate 111 of the container 11 and the photocurable resin RL. Moreover, the irradiation with the inhibition light is carried out in a manner such that the inhibition light is totally reflected at the boundary surface BS between the bottom plate 111 of the container 11 and the photocurable resin RL. The reaction light irradiation section 13 and the inhibition light irradiation section 14 may be each controlled manually by the operator or may be each controlled automatically by the stereolithography device 1 or other device.

In the irradiation step S12, the reaction light passes through the boundary surface BS, curing of the photocurable resin RL that is present between the bottom plate 111 of the container 11 and the bottom surface 121 of the holder 12 is accelerated. However, since the inhibition light is totally reflected at the boundary surface BS, the inhibition light, as evanescent light, enters the photocurable resin RL from the boundary surface BS. Thus, in the vicinity of the bottom plate 111 of the container 11 which evanescent light enters, curing of the photocurable resin RL does not occur or insufficiently occurs even when irradiation with the reaction light is carried out. Thus, there is a low possibility that the photocurable resin RS of which the structure is made adheres to the bottom plate 111 of the container 11.

The lifting step S13 is a step of the lifting mechanism lifting the holder 12. Note here that the direction in which the holder 12 is lifted is a direction in which the holder 12 moves away from the bottom plate 111 of the container 11, and an amount by which the holder 12 is lifted is approximately the same as a thickness of one layer of the structure. The lifting mechanism may be controlled manually by an operator or may be controlled automatically by the stereolithography device 1 or other device.

In the lifting step S13, the structure which is made of the photocurable resin RS is lifted together with the holder 12, and a photocurable resin RL that is to be cured in the next irradiation step S12 is replenished between the structure and the bottom plate 111 of the container 11.

After stereolithography of the structure has been completed by repeating the irradiation step S12 and the lifting step S13, the posttreatment step S14 is carried out. The posttreatment step S14 is a step of taking a structure for which stereolithography has been completed out of the container 11 and subjecting the structure that has been taken out of the container 11 to a treatment such as exposure to light and/or cleaning. In the posttreatment step S14, a treatment such as complete light exposure of an unexposed resin and/or firing thereof may be further carried out.

(Effect of Stereolithography Device)

As described above, the stereolithography device 1 includes: the container 11 for storing the photocurable resin RL before curing, the container 11 having the optically transparent bottom plate 111; the holder 12 configured to be immersed into the photocurable resin RL; the reaction light irradiation section 13 configured to carry out irradiation with reaction light having an action of accelerating curing of the photocurable resin RL in a manner such that the reaction light passes through the boundary surface BS between the bottom plate 111 and the photocurable resin RL; and the inhibition light irradiation section 14 configured to carry out irradiation with inhibition light having an action of inhibiting curing of the photocurable resin RL in a manner such that the inhibition light is totally reflected at the boundary surface BS.

Thus, the stereolithography device 1 makes it possible to reduce a possibility that the structure made of the photocurable resin RS adheres to the bottom plate 111 of the container 11 during the production of the structure.

(Variation of Stereolithography Device)

Figure 3A:
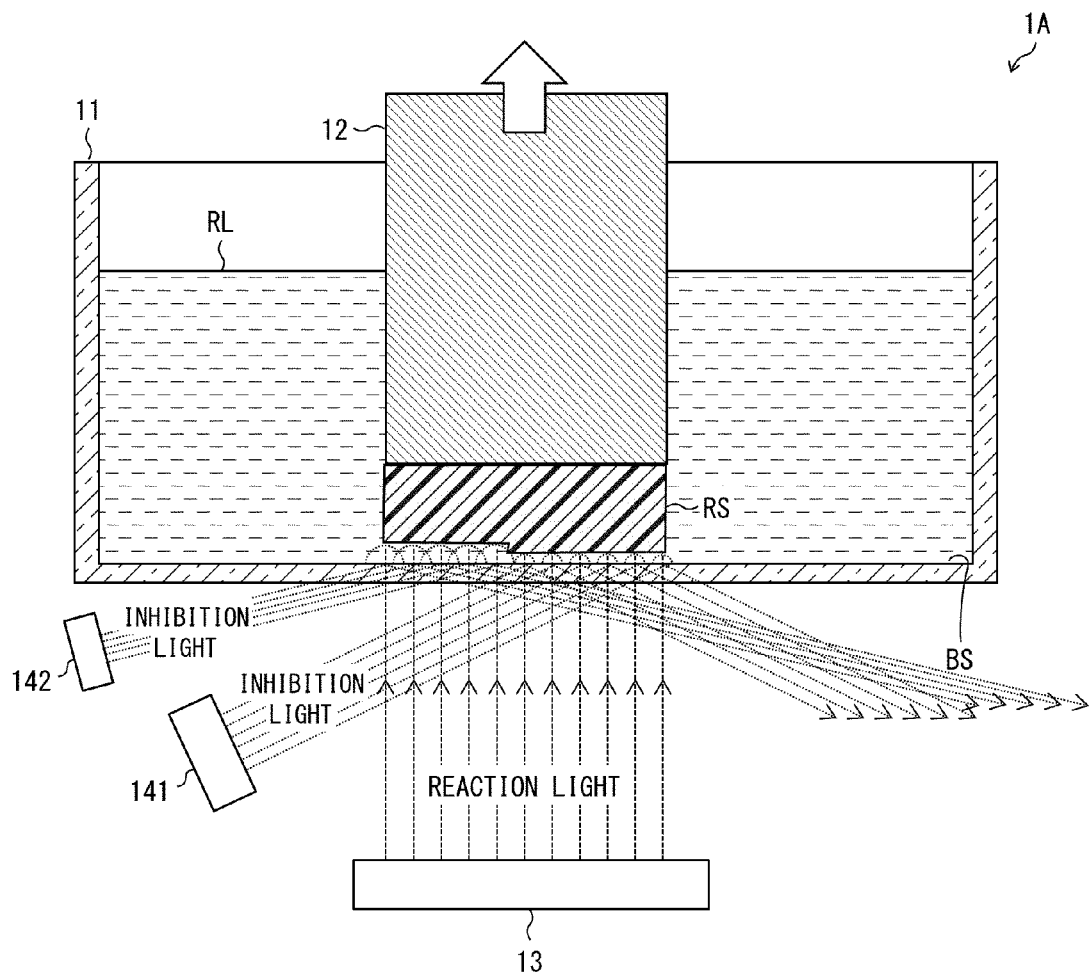
FIGS. 3A and 3B show a cross-sectional view illustrating a variation of the stereolithography device illustrated in FIG. 1A.

A variation of the stereolithography device 1 will be described with reference to FIGS. 3A and 3B. FIG. 3A is a cross-sectional view illustrating a configuration of a stereolithography device 1A in accordance with the present variation.

Figure 3B:
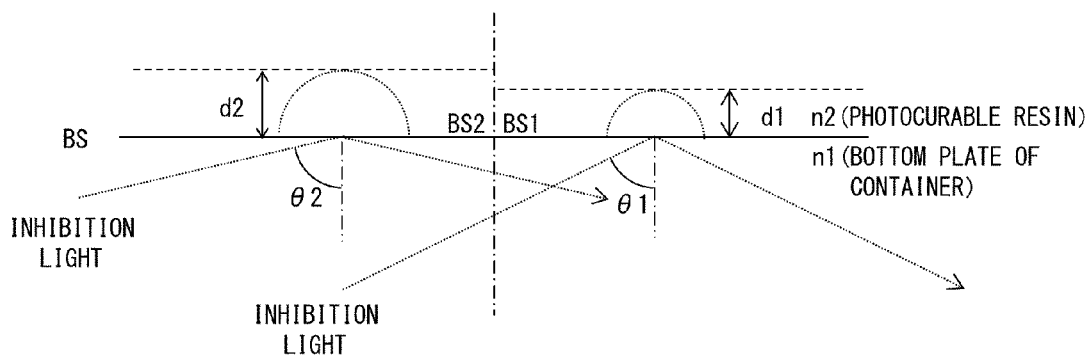

While the stereolithography device 1 illustrated in FIGS. 1A and 1B includes one inhibition light irradiation section 14, the stereolithography device 1A illustrated in FIGS. 3A and 3B includes two inhibition light irradiation sections 141 and 142. Since the configuration of the stereolithography device 1A other than the inhibition light irradiation sections 141 and 142 is the same as the configuration of the stereolithography device 1 other than the inhibition light irradiation section 14, a description thereof will be omitted here.

The inhibition light irradiation sections 141 and 142 are components for irradiating, with inhibition light, the bottom plate 111 of the container 11 in a manner such that the inhibition light is totally reflected at the boundary surface BS between the bottom plate 111 of the container 11 and the photocurable resin RL. Note, however, that a region BS1 on which inhibition light irradiated by a first inhibition light irradiation section 141 is incident at the boundary surface BS and a region BS2 on which inhibition light irradiated by a second inhibition light irradiation section 142 is incident at the boundary surface BS are different from each other. Note also that an incidence angle θ1 at which inhibition light irradiated by the first inhibition light irradiation section 141 is incident on the boundary surface BS and an incidence angle θ2 at which inhibition light irradiated by the second inhibition light irradiation section 142 is incident on the boundary surface BS are different from each other. Thus, a thickness d1 of a region where inhibition light as evanescent light passes through the region BS1 and enters the photocurable resin RL and a thickness d2 of a region where inhibition light as evanescent light passes through the region BS2 and enters the photocurable resin RL are different from each other. Thus, with use of the stereolithography device 1A, it is possible to produce a structure having a level difference on a surface thereof.

The following will consider, as an example, a case where the refractive index n1 of the bottom plate 111 is 1.52, the refractive index n2 of the photocurable resin RL is 1.33, and the wavelength A of the inhibition light is 405 nm. Assuming that the incidence angle θ1 at which inhibition light irradiated by the first inhibition light irradiation section 141 is incident on the boundary surface BS is 75 degrees, the thickness d1 of the region where evanescent light passes through the region BS1 and enters the photocurable resin RL is approximately 52 nm. Assuming that the incidence angle θ2 at which inhibition light irradiated by the second inhibition light irradiation section 142 is incident on the boundary surface BS is 63 degrees, the thickness d2 of the region where evanescent light passes through the region BS1 and enters the photocurable resin RL is approximately 126 nm. Thus, with use of the stereolithography device 1A, it is possible to produce a structure having a level difference of about 74 nm on a surface thereof.

As described above, the stereolithography device 1A includes the plurality of inhibition light irradiation sections 141 and 142 that carry out irradiation with inhibition light beams which are incident at different incidence angles θ1 and θ2 on the respective regions BS1 and BS2 having different boundary surfaces BS. Thus, with use of the stereolithography device 1A, it is possible to produce a structure having a level difference on a surface thereof.

Specific Examples of Structure

With a stereolithography device like the stereolithography device 1A, it is possible to produce a planar light diffraction element that is constituted by a plurality of microcells which have respective thicknesses or refractive indices set independently of each other and that has an optical computing function. In response to signal light having entered such a planar light diffraction element, signal light beams having different phases that have passed through the respective microcells mutually interfere with each other, so that predetermined optical computing is carried out. Note that, in the present specification, the term "microcell" refers to, for example, a cell having a cell size of less than 10 μm. Note also that, in the present specification, the term "cell size" refers to a square root of an area of a cell. For example, in a case where a microcell has a square shape in a plan view, the cell size is a length of one side of the cell. The cell size has a lower limit that is not particularly limited and can be, for example, 1 nm.

Figure 4:
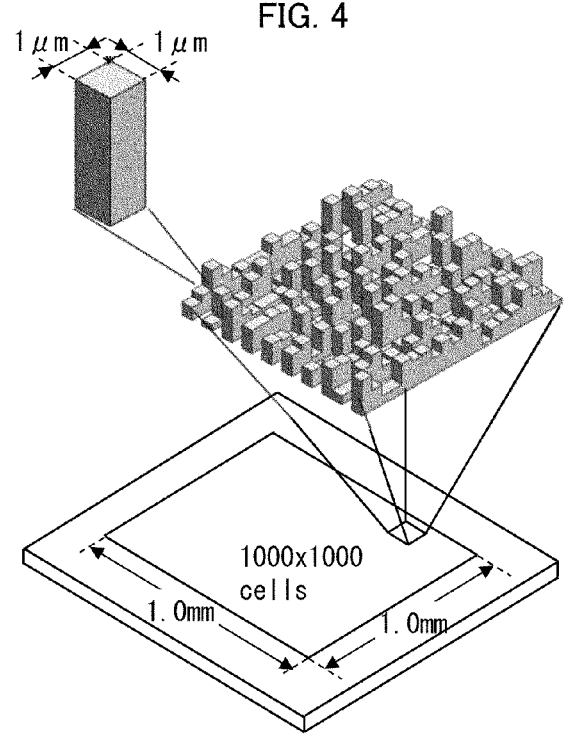
FIG. 4 is a perspective view illustrating a specific example of a planar light diffraction element that can be produced with use of a stereolithography device like the stereolithography device illustrated in FIG. 3A.

FIG. 4 illustrates a specific example of such a planar light diffraction element. FIG. 4 is a perspective view of a planar light diffraction element 100 in accordance with the present specific example.

The planar light diffraction element 100 in accordance with the present specific example has a square active region with a length of 1.0 mm on each side. This active region is constituted by 1000×1000 microcells arranged in a matrix pattern. Each of the microcells is constituted by quadrangular prism-shaped pillars that are formed on a 100-μm thick base and that have a square bottom surface bottom with a length of 1 μm on each side. The pillars have respective heights of any one of 0 nm, 100 nm, 200 nm, ..., 1100 nm, and 1200 nm (13 levels in 100-nm steps). The heights are determined such that a phase-change amount of light which passes through a microcell constituted by such pillars is a desired value.

To produce such a planar light diffraction element, inhibition light may be incident on a region corresponding to each microcell at an incidence angle corresponding to a pillar constituting the microcell. In this case, a digital mirror device (DMD) may be used as the inhibition light irradiation sections 141 and 142. The digital mirror device (DMD) includes a plurality of mirrors (number of which is equal to or more than the number of microcells) which carry out irradiation with inhibition light beams that are incident on different regions of the boundary surface BS at different incidence angles.

(Variation 1 of Reaction Light Irradiation Section)

Figure 5:
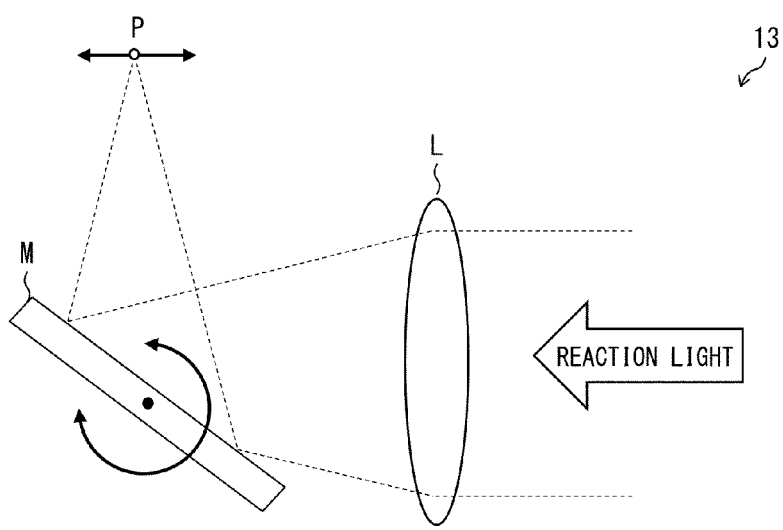
FIG. 5 is a schematic view illustrating a first variation of a reaction light irradiation section which is included in the stereolithography device illustrated in FIG. 1A.

A first variation of the reaction light irradiation section 13 will be described with reference to FIG. 5. FIG. 5 is a schematic view of a reaction light irradiation section 13 in accordance with the present variation.

The reaction light irradiation section 13 in accordance with the present variation is constituted by a condensing lens L and a mirror M. The condensing lens L is a component for condensing reaction light that has been emitted from a light source (not illustrated). The mirror M is a component for reflecting reaction light that has been condensed by the condensing lens L. The mirror M is configured such that an orientation of a reflection surface is controllable. Thus, with use of the reaction light irradiation section 13 in accordance with the present specific example, it is possible to move an irradiation point P of the reaction light in a manner such that the irradiation point P scans the bottom surface 121 of the holder 12.

(Variation 2 of Reaction Light Irradiation Section)

Figure 6:
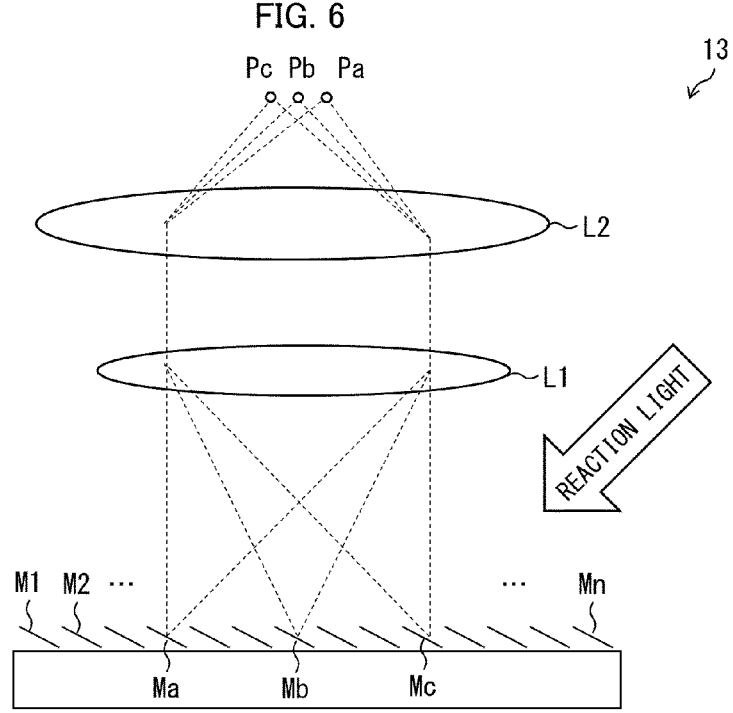
FIG. 6 is a schematic view illustrating a second variation of a reaction light irradiation section which is included in the stereolithography device illustrated in FIG. 1A.

A second variation of the reaction light irradiation section 13 will be described with reference to FIG. 6. FIG. 6 is a schematic view of a reaction light irradiation section 13 in accordance with the present variation.

The reaction light irradiation section 13 in accordance with the present variation is constituted by a DMD including a plurality of mirrors M1 to Mn (n is a natural number that is not less than 2), a collimating lens L1, and a condensing lens L2. Each of the mirrors Mi (i is a natural number that is not less than 1 and not more than n) constituting the DMD is a component for reflecting reaction light that has been emitted from a light source (not illustrated). The collimating lens L1 is a component for collimating reflection light that has been reflected by the mirrors Mi constituting the DMD. The condensing lens L2 is a component for condensing reaction light that has been reflected by the mirrors Mi and has been collimated by the collimating lens L1. Each of the mirrors Mi constituting the DMD is configured such that an orientation of a reflection surface is controllable. For example, in a case where the orientation of the reflection surface of a mirror Ma is controlled so that the reflection light is incident on the collimating lens L1, it is possible to irradiate a point Pa with the reaction light, and in a case where the orientation of the reflection surface of the mirror Ma is controlled so that the reflection light is not incident on the collimating lens L1, it is possible to avoid the irradiation of the point Pa with the reaction light. Thus, with use of the reaction light irradiation section 13 in accordance with the present specific example, it is possible to switch, for each point, between irradiation of the bottom surface 121 of the holder 12 with reaction light and non-irradiation of the bottom surface 121 of the holder 12 with reaction light. This makes it possible to shape a microstructure with use of a photocurable resin.

SUMMARY

A stereolithography device in accordance with a first aspect of the present invention includes: a container for storing a photocurable resin before curing, the container having an optically transparent bottom plate; a holder configured to be immersed into the photocurable resin; a reaction light irradiation section configured to carry out irradiation with reaction light having an action of accelerating curing of the photocurable resin in a manner such that the reaction light passes through a boundary surface between the bottom plate and the photocurable resin; and an inhibition light irradiation section configured to carry out irradiation with inhibition light having an action of inhibiting curing of the photocurable resin in a manner such that the inhibition light is totally reflected at the boundary surface.

A stereolithography device in accordance with a second aspect of the present invention is configured, in addition to the configuration of the stereolithography device in accordance with the first aspect, such that the inhibition light irradiation section comprises a plurality of inhibition light irradiation sections that carry out irradiation with inhibition light beams which are incident on different regions of the boundary surface at different incidence angles.

A stereolithography device in accordance with a third aspect of the present invention is configured, in addition to the configuration of the stereolithography device in accordance with the first or second aspect, such that the inhibition light irradiation section comprises a digital mirror device (DMD) having a plurality of mirrors that carry out irradiation with inhibition light beams which are incident on different regions of the boundary surface at different incidence angles.

A method for producing a structure in accordance with a fourth aspect of the present invention includes: a pretreatment step of storing, in a container having an optically transparent bottom plate, a photocurable resin before curing, and immersing a holder into the photocurable resin; and an irradiation step of carrying out irradiation with reaction light having an action of accelerating curing of the photocurable resin in a manner such that the reaction light passes through a boundary surface between the bottom plate and the photocurable resin, and carrying out irradiation with inhibition light having an action of inhibiting curing of the photocurable resin in a manner such that the inhibition light is totally reflected at the boundary surface.

A method for producing a structure in accordance with a fifth aspect of the present invention is a method, in the method for producing a structure in accordance with the fourth aspect, for producing a planar light diffraction element that is constituted by a plurality of microcells and that has an optical computing function, the microcells being each constituted by pillars.

(Remarks)

The present invention is not limited to the above-described embodiments, but can be altered within the scope of the claims. The present invention also encompasses, in its technical scope of the present disclosure, any embodiment derived by combining technical means disclosed in differing embodiments.

REFERENCE SIGNS LIST 1 stereolithography device
11 container
111 bottom plate
12 holder
121 bottom surface
13 reaction light irradiation section
14 inhibition light irradiation section

The invention claimed is:

1. A stereolithography device comprising:
a container that stores a photocurable resin, the container having a bottom plate that is optically transparent;
a holder configured to be immersed into the photocurable resin;
a reaction light irradiation section configured to irradiate a reaction light that accelerates curing of the photocurable resin, wherein the reaction light passes through a boundary surface extending between the bottom plate and the photocurable resin; and
a plurality of inhibition light irradiation sections configured to irradiate inhibition light beams, which are incident on different regions of the boundary surface at different incidence angles and are totally reflected at the boundary surface,
wherein each of the inhibition light beams inhibits curing of the photocurable resin.

2. A stereolithography device comprising:
a container that stores a photocurable resin, the container having a bottom plate that is optically transparent;
a holder configured to be immersed into the photocurable resin;
a reaction light irradiation section configured to irradiate a reaction light that accelerates curing of the photocurable resin, wherein the reaction light passes through a boundary surface extending between the bottom plate and the photocurable resin; and
a plurality of inhibition light irradiation sections configured to irradiate inhibition light beams, which are incident on different regions of the boundary surface at different incidence angles and are totally reflected at the boundary surface, wherein each of the inhibition light beams inhibits curing of the photocurable resin, wherein a digital mirror device (DMD) having a plurality of mirrors is used as the plurality of inhibition light irradiation sections.

3. A method for producing a structure by the stereolithography device according to claim 1, the method comprising:

storing, in the container, the photocurable resin;

immersing the holder into the photocurable resin;

irradiating the reaction light through the boundary surface to accelerate curing of the photocurable resin, and irradiating the inhibition light beams so as to be incident on the different regions of the boundary surface at the different incidence angles and so as to be totally reflected at the boundary surface.

4. The method according to claim 3, wherein the structure is a planar light diffraction element that is constituted by a plurality of microcells and that has an optical computing function, the microcells being each constituted by pillars.

* * * * *